(12) United States Patent
Xiao et al.

(10) Patent No.: US 11,015,463 B2
(45) Date of Patent: May 25, 2021

(54) TURBINE AND BRAYTON CYCLE INCLUDING SAME

(71) Applicant: Zhejiang University, Hangzhou (CN)

(72) Inventors: Gang Xiao, Hangzhou (CN); Kaixiang Xing, Hangzhou (CN); Tianfeng Yang, Hangzhou (CN); Mingjiang Ni, Hangzhou (CN); Zhongyang Luo, Hangzhou (CN); Kefa Cen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 54 days.

(21) Appl. No.: 16/444,580

(22) Filed: Jun. 18, 2019

(65) Prior Publication Data

US 2020/0263552 A1    Aug. 20, 2020

(30) Foreign Application Priority Data

Feb. 15, 2019    (CN) .......................... 201910117442.7

(51) Int. Cl.
*F01D 5/28*    (2006.01)
*F01D 5/18*    (2006.01)
(Continued)

(52) U.S. Cl.
CPC ............... *F01D 5/288* (2013.01); *F01D 5/18* (2013.01); *F01D 5/186* (2013.01); *F01D 5/28* (2013.01);
(Continued)

(58) Field of Classification Search
CPC . F01D 5/18; F01D 5/181; F01D 5/182; F01D 5/183; F01D 5/184; F01D 5/185; F01D 5/186; F01D 5/187; F01D 5/188; F01D 5/189; F01D 5/288; F01D 25/12; F05D 2260/20; F05D 2260/201; F05D 2260/202; F05D 2260/203; F05D 2260/221; F05D 2300/611; F05D 2240/81; F03G 6/064; F01K 25/103; F01K 7/32; F02C 1/05; F02C 1/10; F02C 1/105

See application file for complete search history.

(56) References Cited

U.S. PATENT DOCUMENTS

2016/0320059 A1\*  11/2016  Pearson .............. C23C 28/3215
2018/0038310 A1\*   2/2018  Xiao ....................... F02G 1/047
2018/0038353 A1\*   2/2018  Xiao ....................... F24S 80/20

\* cited by examiner

*Primary Examiner* — Mark A Laurenzi
*Assistant Examiner* — Xiaoting Hu
(74) *Attorney, Agent, or Firm* — David D. Brush; Westman, Champlin & Koehler, P.A.

(57) ABSTRACT

A turbine for solar thermal power generation and a Brayton cycle are disclosed. The turbine includes a blade which has a cooling working medium inlet and a cooling working medium jet orifice. The blade is provided as a cavity with hollow interior; the cooling working medium inlet is located inside the blade; the cooling working medium jet orifice is provided on the blade surface on which is provided a spectral conversion coating; the spectral conversion coating converts heat on the blade surface into conversion characteristic band radiation which is radiation energy adjacent to cooling working medium characteristic band radiation of a cooling working medium. The turbine adopts a characteristic spectral coating and a jet cooling to enhance the cooling effect for a turbine blade and to improve the system efficiency of the Brayton cycle.

10 Claims, 9 Drawing Sheets

(51) Int. Cl.
F03G 6/06 (2006.01)
F02C 1/05 (2006.01)
F01K 25/10 (2006.01)

(52) U.S. Cl.
CPC .............. F02C 1/05 (2013.01); F03G 6/064 (2013.01); F01K 25/103 (2013.01); F05D 2260/202 (2013.01); F05D 2260/221 (2013.01); F05D 2300/611 (2013.01)

TURBINE AND BRAYTON CYCLE INCLUDING SAME

FIELD OF THE INVENTION

The present invention relates to the technical field of solar thermal power generation, especially a turbine and a Brayton cycle including the same.

DESCRIPTION OF THE PRIOR ART

The Brayton cycle, also known as the Joule cycle, is a thermodynamic cycle with gas as working medium consisting of four processes: isentropic compression, isobaric heat absorption, isentropic expansion, and isobaric cooling. The Brayton cycle, with gas at supercritical state as the working medium, has significant advantages of efficiency. The compressor operating point is provided at a high-density area near a pseudo-critical temperature, and the heat exchanger operating point is provided at a low-density area after the pseudo-critical temperature by using abruptly changing phenomenon of supercritical working medium at the pseudo-critical region, in order to reduce the compression power consumption and reach higher efficiency when the cooling of the working medium is ensured.

A turbine is a machine that converts the energy contained in a fluid medium into mechanical work and is an important component in the Brayton cycle. The most important component of the turbine is a rotating element (rotor or impeller) mounted on a shaft of the turbine, and the rotating element has blades evenly arranged along the circumference. In the Brayton cycle, the energy of the high-temperature working medium is converted into kinetic energy when flowing through the nozzle in the flow; the working medium impacts the blades when flowing through the rotating element, and drives the rotating element to rotate, thereby driving the rotation of the shaft, and converting the thermal energy of the working medium into mechanical energy. The shaft drives other machines directly or via a transmission mechanism to output mechanical work.

Currently, the operating temperature of the Brayton cycle can reach above 1,350° C., and the temperature of the blade in the turbine can be cooled to below 950° C. by the prior art. The system efficiency of the Brayton cycle is positively correlated with the hot end temperature of the cycle (that is, the inlet temperature of the working medium entering the turbine, and the working temperature of the turbine). Therefore, increasing the hot end temperature of the Brayton cycle is one of the main ways to improve system efficiency. The cycle parameters of supercritical carbon dioxide Brayton cycle at high temperatures are limited due to the extreme conditions such as structural strength and manufacturing of the system unit material. Therefore, the temperature of the existing designed supercritical carbon dioxide Brayton cycle is generally below 700° C. However, it can be found from the existing air Brayton cycle that the Brayton cycle with the supercritical working medium as the circulating working medium has the potential to operate at temperatures above 1,000° C. Under this temperature condition, the thermal cycle efficiency of supercritical carbon dioxide Brayton cycle will be greatly improved, and even may exceed 55%, which will be nearly 37.5% higher than the thermal efficiency (slightly more than 40%) of the most advanced large-sized steam power apparatus, and will be much higher than the most widely used steam Rankine cycle (the average thermal efficiency of the steam Rankine cycle is only 34%) at present.

Turbine blade cooling is also one of the main challenges for the supercritical carbon dioxide Brayton cycle at high temperatures. The current cooling method has limited cooling capacity for turbine blades, and cannot further cool the turbine blades, which limits the heat transfer temperature difference between the working medium and the blades, so that the temperature of the working medium cannot be increased, that is, the hot end temperature of the Brayton cycle cannot be improved, thus the system efficiency of the Brayton cycle cannot be improved.

SUMMARY OF THE INVENTION

An exemplary embodiment of the present invention provides a turbine based on the above technical problems. The turbine can enhance the cooling effect of the turbine blades, and can also increase the temperature of the circulating working medium and the hot end temperature of the Brayton cycle while ensuring the safe and efficient operation of the turbine, thereby improving the system efficiency of the Brayton cycle.

Specifically, an embodiment the present invention is described as follows:

A turbine, including blades with a cooling working medium inlet and a cooling working medium jet orifice; the blade is provided as a cavity with hollow interior; the cooling working medium jet orifice is one or more which are provided on the blade surface; the cooling working medium jet can enter the blade for cooling through the cooling working medium inlet; the blade surface is provided with a spectral conversion coating; the cooling working medium jet entering the blade can also flow out through the cooling working medium jet orifice, and can form a cooling working medium jet diaphragm layer on the surface of the spectral conversion coating. The spectral conversion coating can convert the heat of the blade surface into the conversion characteristic band radiation which is the radiation energy adjacent to the cooling working medium characteristic band radiation of the cooling working medium.

Compared with the prior art, the temperature of the circulating working medium is higher than the temperature of the turbine blade; the circulating working medium transfers part of the heat to the blade through heat conduction and heat radiation. Meanwhile the heat transferred by the circulating working medium to the blade surface can be converted into conversion characteristic band radiation by the spectral conversion coating; the conversion characteristic band radiation is adjacent to the cooling working medium characteristic band radiation of the cooling working medium, and is strongly absorbed by the cooling working medium jet and carried away, thereby reducing the thermal radiation to the blade surface by the circulating working medium, and enhancing the cooling for the blade. An exemplary embodiment of the invention can enhance the cooling of the blade using characteristic spectral coating technology to ensure the safety of the blade, increase the temperature of the circulating working medium as much as possible within the range allowed by the blade material, increase the temperature of the circulating working medium, that is, the working temperature of the turbine, and increase the hot end temperature of the Brayton cycle, thereby correspondingly increasing the system efficiency of the Brayton cycle.

In addition, in an exemplary embodiment, the conversion characteristic band radiation refers to the radiation energy near the central wavelength of the characteristic absorption peak of the cooling working medium characteristic band radiation which is concentrated by the spectral line width of the characteristic absorption peak.

According to an exemplary embodiment, the closer the central wavelength of the characteristic absorption peak of the conversion characteristic band radiation is to the central wavelength of the characteristic absorption peak of the cooling working medium characteristic band radiation, the easier the conversion characteristic band radiation is absorbed by the cooling working medium jet diaphragm layer, and the better the cooling effect for the blade.

In addition, in an exemplary embodiment, the central wavelength of the characteristic absorption peak of the conversion characteristic band radiation is the same as the central wavelength of the characteristic absorption peak of the cooling working medium characteristic band radiation, and the spectral line width of the conversion characteristic band radiation is much smaller than that of the cooling working medium characteristic band radiation.

According to an exemplary embodiment, the conversion characteristic band radiation which is converted by the spectral conversion coating is more concentrated within a narrower wavelength range near the characteristic absorption peak of the cooling working medium characteristic band radiation, and the cooling working medium jet diaphragm layer has the highest absorption efficiency for the conversion characteristic band radiation, which results in a better cooling effect of the spectral conversion coating on the blade. Correspondingly, the temperature of the circulating working medium can be greatly improved, which further improves the system efficiency of the Brayton cycle.

In addition, in an exemplary embodiment, the conversion characteristic band radiation does not overlap with the circulating working medium characteristic band radiation of the circulating working medium flowing in the turbine.

According to an exemplary embodiment, the conversion characteristic band radiation does not overlap with the circulating working medium characteristic band radiation, namely the cooling working medium characteristic band radiation does not overlap with the circulating working medium characteristic band radiation. The blade can utilize the spectral conversion coating and the cooling working medium jet diaphragm layer to shielding part of the heat released by the circulating working medium, and can convert the remainder of the heat released by the circulating working medium into conversion characteristic band radiation as much as possible, and then the radiation is absorbed and carried away by the cooling working medium jet diaphragm layer, thereby enhancing the cooling effect for the blade.

In addition, in an exemplary embodiment, an intermediate base layer with good thermal conductivity is provided between the spectral conversion coating and the blade, and the intermediate base layer can transfer heat on the blade to the spectral conversion coating.

According to an exemplary embodiment, the intermediate base layer can better transfer the heat on the blade surface to the spectral conversion coating, as well as facilitate better attachment of the spectral conversion coating to the blade surface.

Further, in an exemplary embodiment, the material of the spectral conversion coating is metal or semiconductor, and the spectral conversion coating is coated on the blade surface.

According to an exemplary embodiment, the coating method can ensure the adaptability of the spectral conversion coating and the surface strength of the blade.

In addition, in an exemplary embodiment, the spectral conversion coating includes a gold base layer which is in contact with the blade surface, an absorption cavity and a distributed reflection layer sequentially distributed on the gold base layer, which can generate a harmonic resonance cavity with the distributed reflection layer, and the absorption cavity can absorb the above harmonic resonance and convert the absorbed heat into conversion characteristic band radiation.

According to an exemplary embodiment, the gold base layer, the distributed reflection layer, and the absorption cavity are used together to obtain a sharp, intense conversion characteristic band radiation with small bandwidth and to improve the light absorption rate of the spectral conversion coating. The spectral conversion coating can convert the heat on the blade into the conversion characteristic band radiation to allow the heat to be absorbed and carried away by the cooling working medium jet, so as to increase the heat transfer temperature difference between the circulating working medium and the blade and increase the temperature of the circulating working medium, thereby improving the system efficiency of the Brayton cycle.

Further, in an exemplary embodiment, the distributed reflection layer is composed of Ge and $SiO_2$ or Ge and ZnS.

According to another aspect, a Brayton cycle is provided, where the Brayton cycle includes a heat source, a regenerator, a pre-cooler, a compressor, a generator, a circulating working medium circulating in the Brayton cycle, and a turbine according to any of the foregoing technical solutions. The turbine, the generator, and the compressor are connected by the same shaft; the heat source, the turbine, the hot side inlets and the hot side outlets of the regenerator, the pre-cooler, the compressor, and the cold side inlets and the cold side outlets of the regenerator are sequentially connected by pipes to form a cycle.

The outlet of the heat source is connected to the inlet of the turbine; the outlet of the turbine is connected to the hot side inlet of the regenerator; the hot side outlet of the regenerator is connected to the inlet of the pre-cooler; the outlet of the pre-cooler is connected to the inlet of the compressor; the outlet of the compressor is connected to the cold side inlet of the regenerator; and the cold side outlets of the regenerator are connected to the inlet of the heat source, thus a circulating hot loop is formed.

The circulating working medium absorbs heat from the heat source; the circulating working medium after the rise of temperature expands and works in the turbine; the turbine drives the generator to generate electricity through the shaft; the expanded circulating working medium flows through the regenerator to exchange heat; the circulating working medium enters the pre-cooler, the compressor and the regenerator in turn after the fall of temperature; the circulating working medium flows out of the cold side outlets of the regenerator and enters the heat source again to absorb the radiation energy; the power required by the work of the compressor is provided by the generator, thus a power generation cycle is completed.

Compared with the prior art, the turbine of the Brayton cycle provided by an exemplary embodiment of the invention uses a characteristic spectral coating and a jet cooling technology, so as to enhance the radiant cooling effect of the turbine, increase the heat transfer temperature difference between the blade and the circulating working medium, and increase the temperature of the circulating working medium and the hot end temperature of the Brayton cycle while ensuring the safe and efficient operation of the turbine, thereby improving the system efficiency of the Brayton cycle.

In addition, in an exemplary embodiment, the heat source includes a heat-collecting cavity; the inner surface of the heat-collecting cavity is provided with a spectral conversion coating which converts the radiation absorbed by the cavity of the heat-collecting cavity into the conversion characteristic band radiation which is strongly absorbed by the circulating working medium.

According to an exemplary embodiment, the radiant heat exchange is enhanced by using the characteristic spectral coating on the surface of the heat-collecting cavity to prevent the excessively high temperature in the heat-collecting cavity from burning out the heat-collecting cavity, thereby ensuring the safe and efficient operation of the heat-collecting cavity.

DETAILED DESCRIPTION

Figure 1:
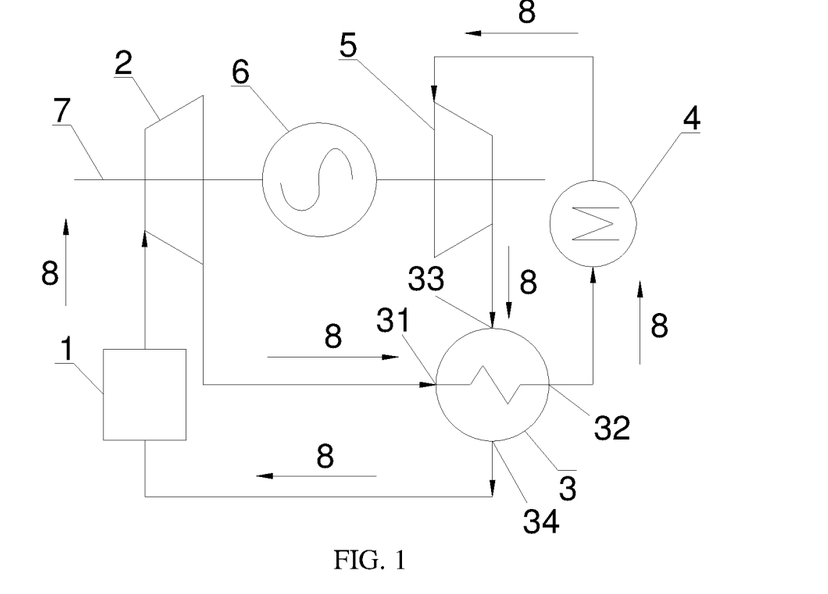
FIG. 1 is a schematic view of a Brayton cycle according to a first embodiment of the present invention.

The following reference numerals are used in FIG. 1:
a heat source 1, a turbine 2, a regenerator 3, a hot side inlet 31, a hot side outlet 32, a cold side inlet 33, a cold side outlet 34, a pre-cooler 4, a compressor 5, a generator 6, a shaft 7, a circulating working medium 8.

Figure 2:
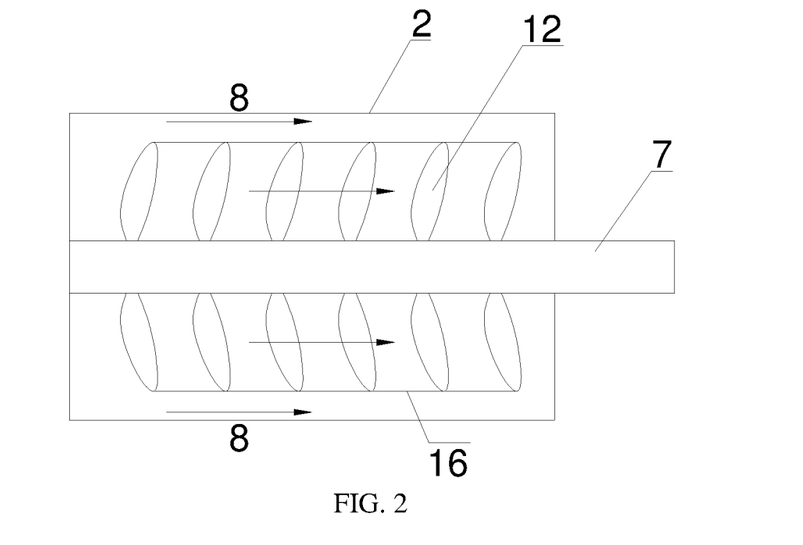
FIG. 2 is a schematic view showing the simple structure inside the turbine of an exemplary embodiment of the present invention.

The following reference numerals are used in FIG. 2:
a turbine 2, a shaft 7, a circulating working medium 8, a blade 12, a rotating element 16.

Figure 3:
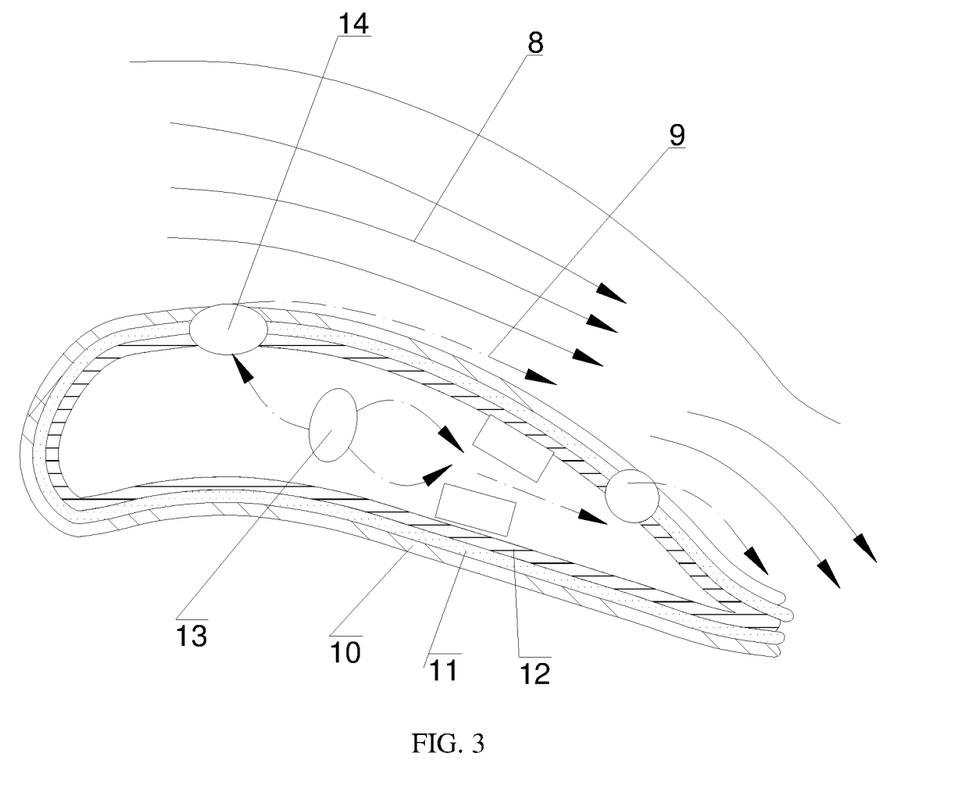
FIG. 3 is a structural schematic view of the reinforced cooling of a blade in the first embodiment of the present invention.

The following reference numerals are used in FIG. 3:
a circulating working medium 8, a cooling working medium jet diaphragm layer 9, a spectral conversion coating 10, a gold base layer 10a, an absorption cavity 10b, a distributed reflection layer 10c, a intermediate base 11, a blade 12, a cooling working medium inlet 13, a cooling working medium jet orifice 14.

Figure 4:
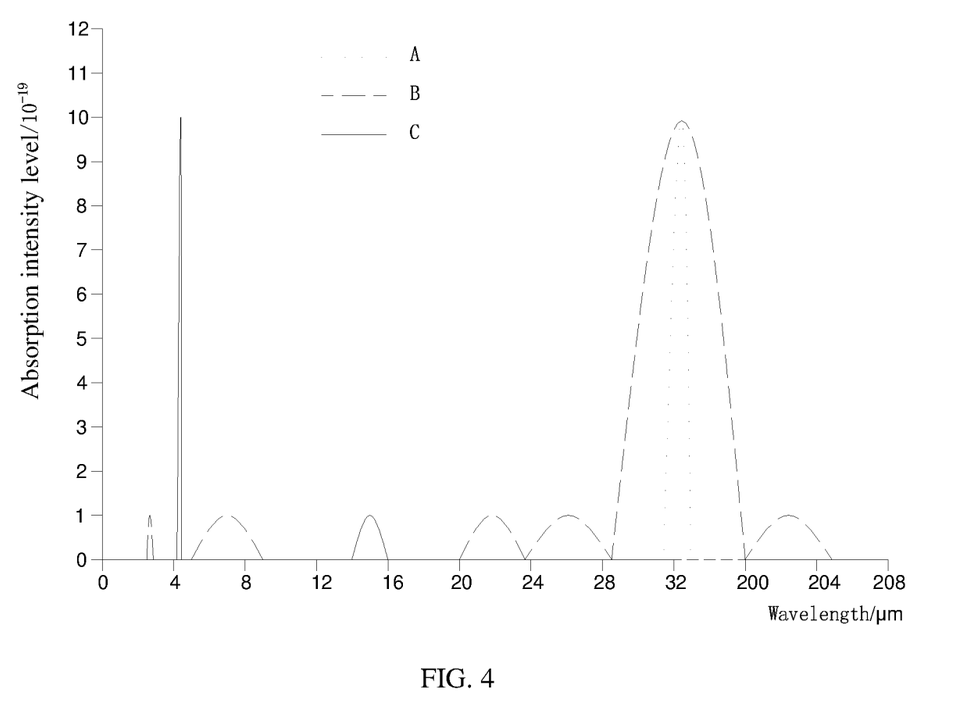
FIG. 4 is a schematic diagram showing the relationship between the conversion characteristic band radiation and the characteristic band radiation of water vapor and carbon dioxide in an exemplary embodiment of the present invention.

The following reference numerals are used in FIG. 4:
the conversion characteristic band radiation A, the cooling working medium characteristic band radiation B, the circulating working medium characteristic band radiation C.

Figure 5:
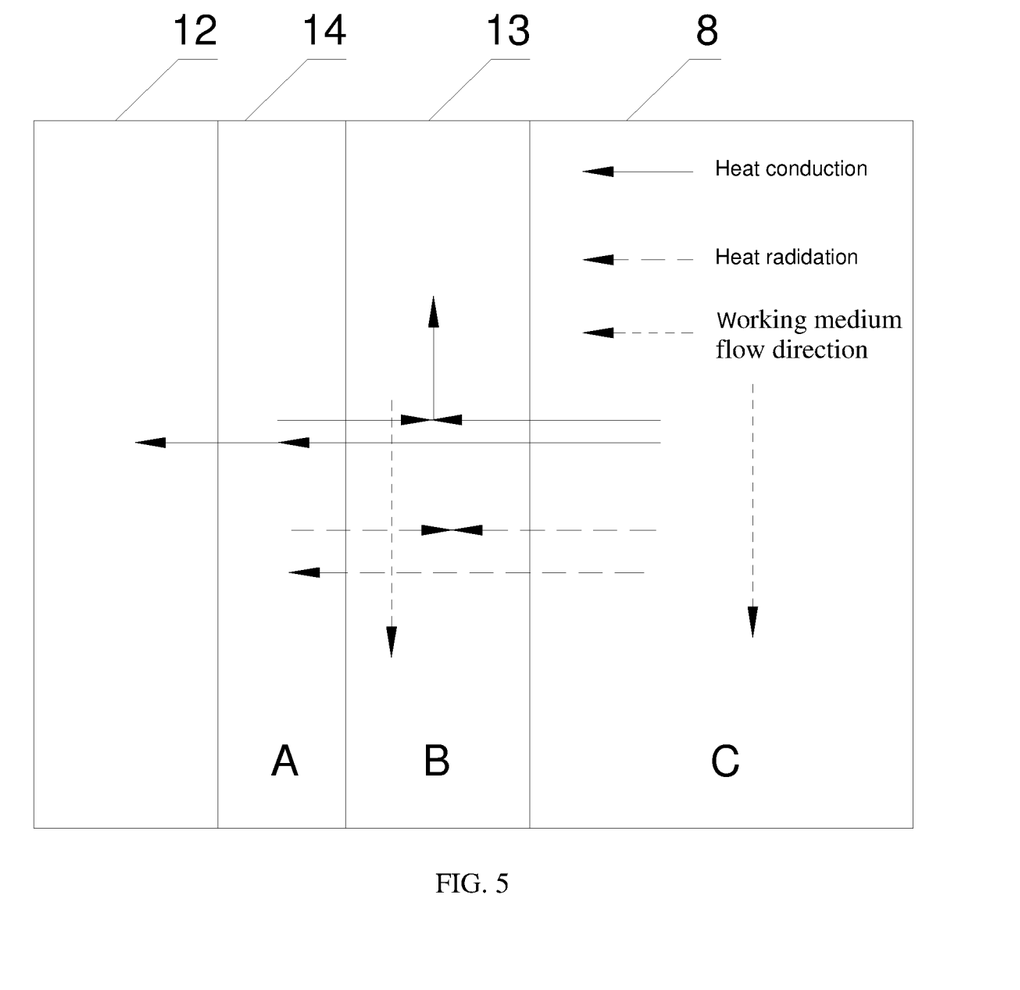
FIG. 5 is a schematic diagram showing heat transfer between a circulating working medium and the blade in the first embodiment of the present invention.

The following reference numerals are used in FIG. 5:
a circulating working medium 8, a blade 12, a cooling working medium inlet 13, a cooling working medium jet orifice 14, the conversion characteristic band radiation A, the cooling working medium characteristic band radiation B, the circulating working medium characteristic band radiation C.

Figure 6:
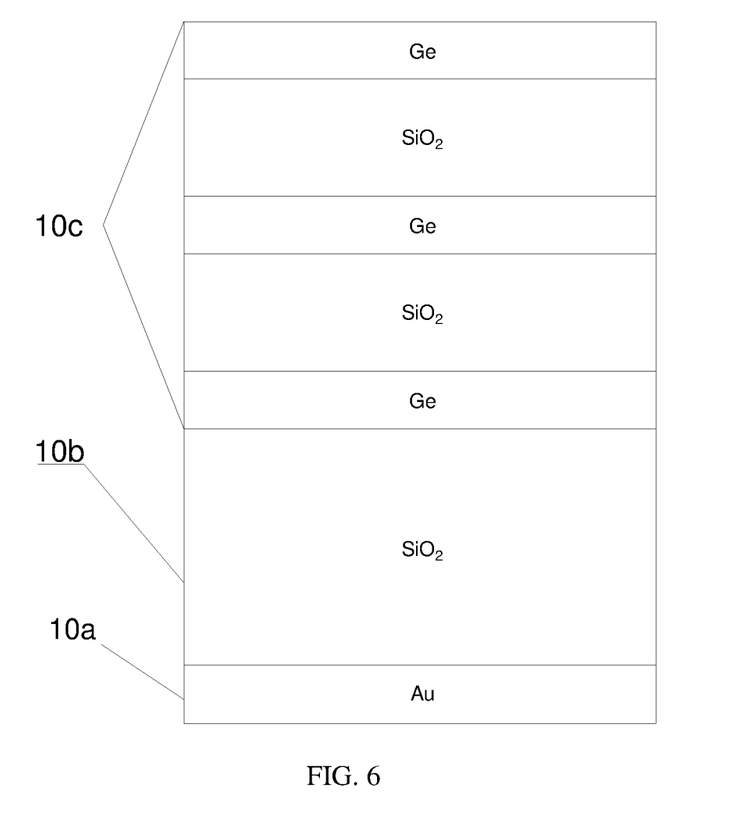
FIG. 6 is a structural schematic diagram of a spectral conversion coating in the first embodiment of the present invention.

The following reference numerals are used in FIG. 6:
a cold sid a gold base layer 10a, an absorption cavity 10b, a distributed reflection layer 10c.

Figure 8:
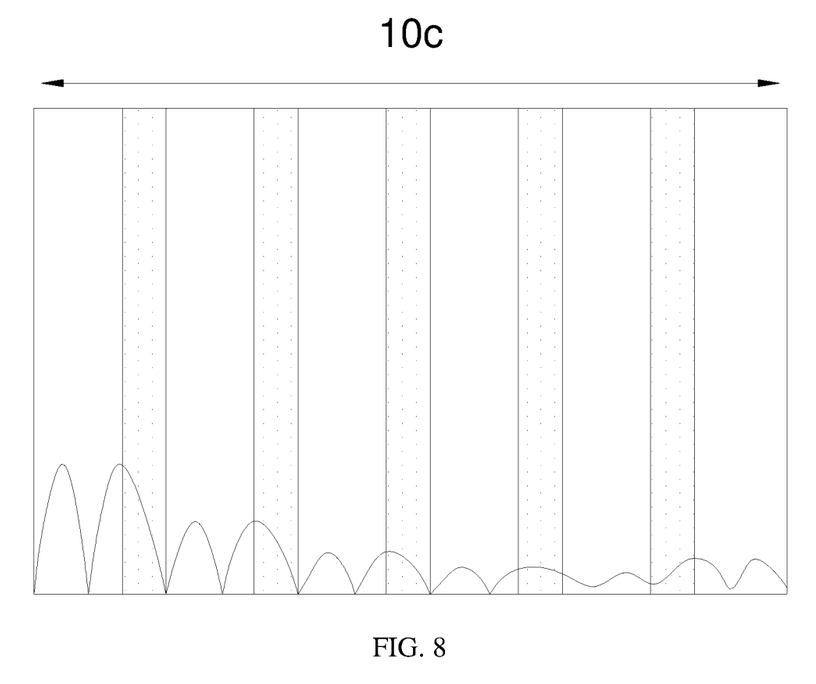
FIG. 8 is a schematic diagram showing the relationship between the number of layers of the distributed reflection layer and the characteristic absorption peak of the radiation.

The following reference numerals are used in FIG. 8:
a distributed reflection layer 10c.

Figure 9:
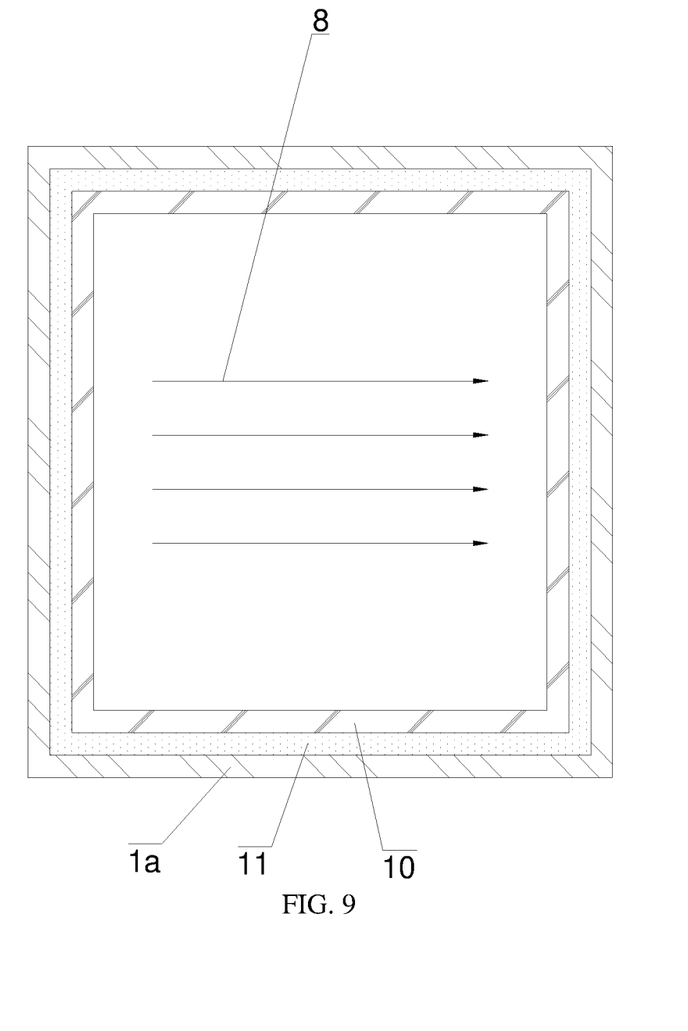
FIG. 9 is a structural schematic view of enhanced radiation heat exchange of a heat-collecting cavity in the first embodiment of the present invention.

The following reference numerals are used in FIG. 9:
a heat-collecting cavity 1a, a circulating working medium 8, a spectral conversion coating 10, a intermediate base 11.

Figure 10:
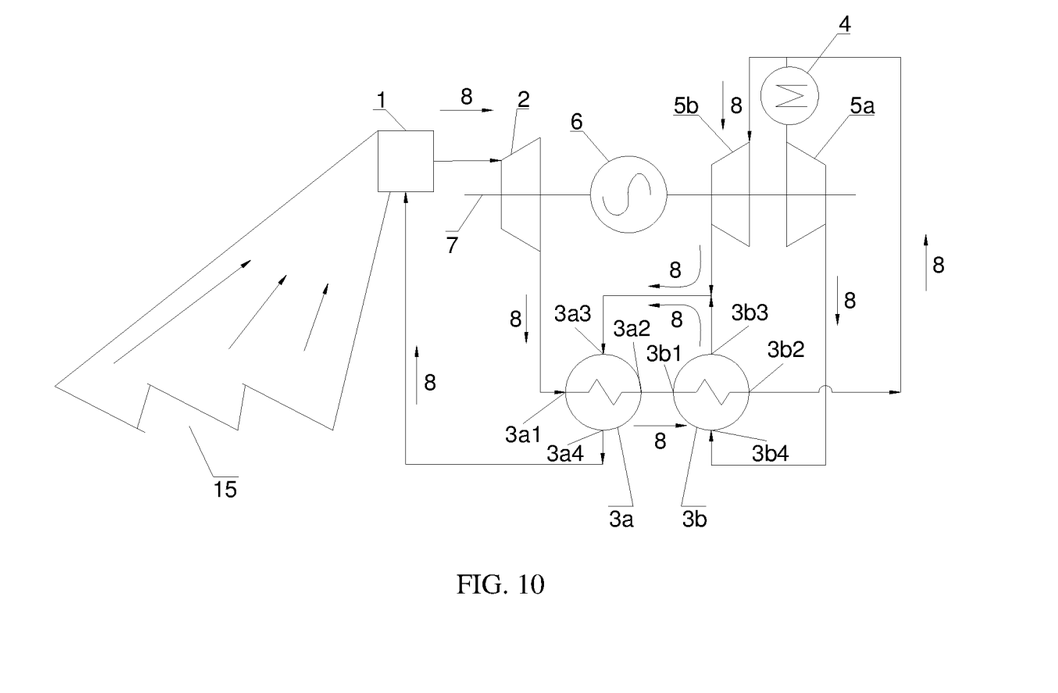
FIG. 10 is a schematic view of the Brayton cycle according to the second embodiment of the present invention.

The following reference numerals are used in FIG. 10:
a heat source 1, a turbine 2, a high-temperature regenerator 3a, a low-temperature regenerator 3b, a hot side inlet 3as1, 3b1, a hot side outlet 3a2, 3b2, a cold side inlet 3a3, 3b3, a cold side outlet 3a4, 3b4, a pre-cooler 4, a main compressor 5a, a re-compressor 5b, a generator 6, a shaft 7, a circulating working medium 8.

DESCRIPTION OF EXEMPLARY EMBODIMENTS

One or more exemplary embodiments of the present invention will be further described in detail below in conjunction with the accompanying drawings. The structure of the turbine and the Brayton cycle including the same are schematically simplified in the drawings.

In the description of one or more embodiments of the present invention, it will be understood that the orientation or positional relationship indicated by terms like "upper", "lower", "front", "back", "left", "right", "top", "bottom", "inside", "outside" are based on that shown in the drawings. The terms are merely for the convenience and simplicity of description rather than an indication or an implication that the apparatus or element must have a specific orientation and must be configured and operated in the specific orientation. Thus the terms should not be construed as a limit to the invention.

First Embodiment

The Brayton cycle is a refrigeration cycle with gas as working medium and can be divided into simple Brayton cycle, recompression Brayton cycle, recompressed partially cooling Brayton cycle, and recompression reheats Brayton cycle or recompression intermediate cooling Brayton cycle. In the Brayton cycle, the heat source of the working medium can be provided by one or more of a tower solar concentrating system, a nuclear reactor, and a fossil fuel combustion system, and the heat absorption capacity of the working medium is flexible. The fossil fuel in the fossil fuel combustion system can be coal or natural gas.

The first embodiment of the present invention provides a Brayton cycle which is a simple Brayton cycle. The heat source of the working medium is the tower solar concentrating system, and the heat source can provide a working medium at a temperature of more than 1,000° C., thus the entire Brayton cycle is at a high temperature.

Referring to FIG. 1, the Brayton cycle in the first embodiment includes the heat source 1, the turbine 2, the regenerator 3, the pre-cooler 4, the compressor 5, the generator 6, and the circulating working medium 8. The turbine 2, the generator 6 and the compressor 5 are connected by the same shaft 7; the heat source 1, the turbine 2, the regenerator 3, the pre-cooler 4, and the compressor 5 are sequentially connected by pipes; the circulating working medium 8 flows in the pipes.

Specifically, the outlet of the heat source 1 is connected to the inlet of the turbine 2; the outlet of the turbine 2 is connected to the hot side inlet 31 of the regenerator 3; the hot side outlet 32 of the regenerator 3 is connected to the inlet of the pre-cooler 4; the outlet of the pre-cooler 4 is connected to the inlet of the compressor 5; the outlet of the compressor 5 is connected to the cold side inlet 33 of the regenerator 3; the cold side outlet 34 of the regenerator 3 is connected to the inlet of the heat source 1, thus a circulating hot loop is formed.

During work, the circulating working medium 8 reaches a high temperature after heated by the heat source 1; the circulating working medium 8 enters the turbine 2 to expand and work; the circulating working medium 8 after the work sequentially passes through the regenerator 3 to recover heat, the pre-cooler 4 for cooling, the compressor 5 for compression, and enters the regenerator 3 again for heating, and finally enters the heat source 1 to be further heated to a high temperature. Therefore, the thermal cycle is completed. The circulating working medium 8 with high temperature after the expansion and working of the turbine 2 enters the regenerator 3 via the hot side inlet 31; the circulating working medium 8 with low temperature is compressed by the compressor 5 and enters the regenerator 2 via the cold side inlet 33. The circulating working medium 8 with high-temperature and low-temperature exchanges heat in the regenerator 3. After heat exchange, the circulating working medium 8 flows out from the hot side outlet 32 and the cold side outlet 34 respectively.

For the power generation cycle, the circulating working medium 8 absorbs heat in the heat source 1; the circulating working medium 8 after the rise of temperature expands and works in the turbine 2; the turbine 2 drives the generator 6 to generate electricity through the shaft 7; the expanded circulating working medium 8 flows through the regenerator 3 to exchange heat; the circulating working medium 8 enters the pre-cooler 4, the compressor 5 and the regenerator 3 in turn after the fall of temperature; the circulating working medium 8 flows out of the cold side outlet 34 of the regenerator 3 and enters the heat source 1 again to absorb the radiation; the power required by the work of the compressor 5 is provided by the generator 6, thus a power generation cycle is completed.

In the Brayton cycle, the circulating working medium 8 can be one of supercritical air, supercritical carbon dioxide, supercritical nitrogen, or supercritical Helium gas. In the present embodiment, the circulating working medium 8 is, in an exemplary embodiment, supercritical carbon dioxide. The carbon dioxide is relatively low in critical pressure (7.38 MPa), and correspondingly low in the critical temperature (31° C.), and has characteristics like relatively stable chemical properties, reliable safety performance, abundant reserves, low cost and availability. Therefore, carbon dioxide is considered to be one of the most promising energy transfer and conversion working media. The supercritical carbon dioxide has a high density and no phase change within a certain operating parameter range. Therefore, the power system equipment such as the compressor and the turbine with supercritical carbon dioxide as the circulating working medium has the advantages of small compressor power consumption, moderate working temperature for the turbine, compact structure, small volume, low manufacturing cost, and modular design.

As mentioned, referring to FIG. 2, the turbine 2 is an important component of the Brayton cycle. The blades 12 of the turbine 2 are evenly arranged on the rotating element 16 which is mounted on the shaft 7 of the turbine 2. The energy possessed by the circulating working medium 8 is converted into kinetic energy as flowing through the nozzle. When flowing through the rotating element 16, the circulating working medium 8 expands and impacts the blade 12, pushes the rotating element 16 to rotate, thereby driving the shaft 7 to rotate. The rotation of the shaft 7 directly drives the generator 6 to work and outputs mechanical work. The temperature of the circulating working medium 8 is also the inlet temperature of the turbine 2, and the rise of the temperature of the circulating working medium 8 can accelerate the rotation of the blade 12. With the increase of rotation speed of the shaft 7, the conversion efficiency of the generator 6 is improved, thus the system efficiency of the Brayton cycle is improved.

In the Brayton cycle, the temperature of the circulating working medium 8 is higher than the temperature of the blade 12, and a heat transfer temperature difference exists therebetween. The high-temperature circulating working medium 8 transfers heat to the blade 12 mainly through heat conduction and heat radiation, so that the temperature of the blade 12 rises. The blade 12 needs to operate at high speed in the turbine 2, which leads to a possibility of fracture; the structural strength of the blade 12 at high-temperature state is weakened, and the fracture is more likely to occur. Considering the material characteristics of the blade 12, it is only possible to reduce the temperature of the circulating working medium 8 or to cool the turbine 2 so as to prevent the excessively high temperature from burning out the turbine 2. If the temperature of the circulating working medium 8 is lowered, the system efficiency of the Brayton cycle will be reduced. Therefore, by adopting the cooling method of cooling the turbine 2, both the turbine 2 and the temperature of the circulating medium 8 is ensured, thereby ensuring the system efficiency of the Brayton cycle.

For the Brayton cycle, the blade 12 can be cooled by internal cooling, jet cooling, and thermal barrier coating cooling. However, the above cooling methods have limited cooling capacity for the turbine 2 which can be further cooled, so that the heat transfer temperature difference between the circulating working medium 8 and the blade 12 is limited, and the temperature of the circulating working medium 8 cannot be increased, that is, the hot end temperature of the Brayton cycle cannot be increased, and ultimately the system efficiency of the Brayton cycle cannot be further improved. The blade 12 of the turbine 2 in the present embodiment uses a characteristic spectral coating combined with a jet cooling technique in order to further cool the turbine 2 and increase the system efficiency of the Brayton cycle, so as to enhance the cooling effect for the blade 12.

Specifically, referring to FIG. 3, the blade 12 of the turbine 2 has a cooling working medium inlet 13 and a cooling working medium jet orifice 14. The blade 12 is provided as a cavity with hollow interior; the cooling working medium inlet 13 is, in an exemplary embodiment, preferably located in the blade 12; the cooling working medium jet orifice 14 is one or more and which are provided on the surface of the blade 12. The cooling working medium jet can enter the blade 12 for cooling through the cooling working medium inlet 13; the cooling working medium jet entering the blade 12 can also flow out through the cooling working medium jet orifice 14 and form a cooling working medium jet diaphragm layer 9 on the surface of the blade 12.

The cooling working medium jet flows through the blade 12, performs a jet cooling, and then reaches the regenerator 3 together with the circulating working medium 8. The cooling working medium jet exchanges heat and is cooled in the regenerator 3; the condensed water in the liquefied form after cooling discharges from the liquid outlet of the regenerator 3, and is separated from the Brayton cycle.

With jet cooling technology, the cooling working medium jet enters the blade 12 from the cooling working medium inlet 13. One part of the cooling working medium jet is internally cooled, and the other part flows out through the cooling working medium jet orifice 14 and forms a cooling working medium jet diaphragm layer 9 on the surface of the blade 12. The convective heat transfer between the cooling working medium jet and the surface of the blade 12 achieves the cooling for the blade 12.

In addition, a small jet channel (not shown) is also provided on the inner surface of the blade 12 in order to enhance the cooling effect for the blade 12. The cooling working medium jet flows from the jet channel into the interior of the blade 12, and is attached to the surface of the blade 12 to flow. The cooling working medium jet convectively exchanges heat with the surface of the blade 12, and carries away the heat of the blade 12.

In particular, the surface of the blade 12 is provided with a spectral conversion coating 10 on the surface of which the above-described cooling working medium jet diaphragm layer 9 is formed by the cooling working medium. The spectral conversion coating 10 can convert the heat on the surface of the blade 12 into conversion characteristic band radiation A which is the radiation energy adjacent to the cooling working medium characteristic band radiation B of the cooling working medium.

Each substance has its characteristic absorption spectrum and several characteristic absorption peaks, each absorption peak has a certain spectral line width. When the light wave absorption intensity in the vicinity of the characteristic absorption peak of the substance is greater, the absorption efficiency is higher; when the characteristic absorption peaks of the substance partially overlap or do not overlap, the light wave absorption intensity and the absorption efficiency are lower. The central wavelength determines the center value of the wavelength distribution of the spectrum, and the spectral line width determines the concentration degree of the energy distribution of the spectrum.

When the high-temperature circulating working medium 8 transfers heat to the blade 12 through heat conduction and heat radiation, the spectral conversion coating 10 on the surface of the blade 12 converts the heat into conversion characteristic band radiation A which is adjacent to the cooling working medium characteristic band radiation B of the cooling working medium, thereby allowing the heat to be easily absorbed and carried away by the cooling working medium jet, reducing the heat radiation of the circulating working medium 8 to the surface of the blade 12, and enhancing the cooling for the blade 12. An exemplary embodiment of the invention can enhance the cooling for the blade 12 by using the characteristic spectral coating technology, ensure the safety of the blade 12, and increase the temperature of the circulating working medium 8 as much as possible within the range allowed by the material of the blade 12, thereby increasing the temperature of the circulating working medium 8 or the working temperature of the turbine 2, increasing the hot end temperature of the Brayton cycle, and improving the system efficiency of the Brayton cycle correspondingly.

In addition, the use of the characteristic spectral coating cooling technology can effectively reduce the number of flow-paths of the cooling working medium jet on the surface of the blade 12, reduce the processing difficulty of the blade 12, and enhances the safety of the blade 12. The use of the characteristic spectral coating cooling technology can also reduce the consumption of the cooling working medium and save costs. In particular, the circulating working medium 8 is able to adopt a higher turbine inlet temperature due to the increase in the heat transfer temperature difference between the blades 12. The rise of the temperature of the circulating working medium 8 in the turbine 2 increases the working temperature of the circulating working medium 8 in the turbine 2, thereby improving the system efficiency of the Brayton cycle.

Currently, the circulating working medium of the turbine in the mainstream Brayton cycle includes carbon dioxide and uses air as the cooling working medium. However, the component of the circulating working medium and the cooling working medium is similar and impure. The characteristic absorption peaks of the both have a certain range of overlap, which cannot effectively convert the heat of the blade transferred from the circulating working medium while shielding the heat transferred from the circulating working medium to the blade through radiation, that is, the characteristic spectral coating technology cannot be used to enhance cooling. Therefore, the Brayton cycle in an exemplary embodiment of the invention uses water vapor as the cooling working medium, which is pure and the component is distinct from that of the circulating working medium. The characteristic absorption peaks of the circulating working medium and the cooling working medium do not overlap basically, which can shield the heat transferred to the blade by the circulating working medium through radiation while effectively converting the heat from the circulating working medium to the blade through heat conduction. That is, the characteristic spectral coating technology can be used to enhance the cooling.

Differences exist in the bands of the characteristic absorption peaks of different substances. As shown in Table 1, the main absorption peak of carbon dioxide is around 2.8 µm and 4.2 µm; the radiation absorption of the water vapor in the mid-far infrared (greater than 25 µm) band, 5 to 10 µm band, 2.5 to 2.8 µm band is relatively strong.

TABLE 1

Difference of characteristic absorption peak between carbon dioxide and water vapor (greater than 2.5 µm)

| Band (cm$^{-1}$) | Absorption Intensity Level of Carbon Dioxide | Absorption Intensity Level of Water Vapor |
|---|---|---|
| 0-50 | can be ignored | $10^{-19}$ |
| 50-350 | can be ignored | $10^{-18}$ |
| 350-430 | can be ignored | $10^{-19}$ |
| 430-500 | $10^{-26}$ | $10^{-19}$ |
| 500-580 | can be ignored | $10^{-20}$ |
| 580-625 | $10^{-21}$ | $10^{-21}$ |
| 625-720 | $10^{-19}$ | $10^{-21}$ |
| 720-1000 | $10^{-23}$ | $10^{-23}$ |
| 1000-1100 | $10^{-23}$ | $10^{-21}$ |
| 1100-1800 | can be ignored | $10^{-19}$ |
| 1800-2000 | $10^{-23}$ | $10^{-19}$ |
| 2000-2120 | can be ignored | $10^{-24}$ |
| 2220-2300 | $10^{-21}$ | $10^{-24}$ |
| 2300-2380 | $10^{-18}$ | $10^{-24}$ |

TABLE 1-continued

Difference of characteristic absorption peak between
carbon dioxide and water vapor (greater than 2.5 μm)

| Band (cm$^{-1}$) | Absorption Intensity Level of Carbon Dioxide | Absorption Intensity Level of Water Vapor |
|---|---|---|
| 2380-3000 | $10^{-25}$ | $10^{-23}$ |
| 3000-3500 | $10^{-25}$ | $10^{-21}$ |
| 3500-3800 | $10^{-20}$ | $10^{-19}$ |
| 3800-4000 | can be ignored | $10^{-19}$ |

Referring to FIG. 4, the circulating working medium characteristic band radiation C of carbon dioxide is narrow and sharp, and the cooling working medium characteristic band radiation B of the water vapor is wider. The characteristic absorption peaks of the circulating working medium characteristic band radiation C and the cooling working medium characteristic band radiation B do not overlap basically. The cooling working medium characteristic band radiation B of the water vapor is wider; then the conversion characteristic band radiation A converted by the spectral conversion coating 10 has a wider range, which will help to reduce the design difficulty of the spectral conversion coating 10, and improve the applicability of the spectral conversion coating 10.

The conversion characteristic band radiation A refers to the radiation energy near the central wavelength of the characteristic absorption peak of the cooling working medium characteristic band radiation B which is concentrated by the spectral line width of the characteristic absorption peak. As described above, the closer the central wavelength of the characteristic absorption peak of the conversion characteristic band radiation A is to the central wavelength of the characteristic absorption peak of the cooling working medium characteristic band radiation B, the easier the conversion characteristic band radiation A is absorbed by the cooling working medium jet diaphragm layer 9, and the better the cooling effect for the blade 12.

In particular, the central wavelength of the characteristic absorption peak of the conversion characteristic band radiation A is the same as the central wavelength of the characteristic absorption peak of the cooling working medium characteristic band radiation B, and the spectral line width of the conversion characteristic band radiation A is much smaller than the spectral line width of the cooling working medium characteristic band radiation B. The conversion characteristic band radiation A which is converted by the spectral conversion coating 10, is more concentrated on a narrower wavelength range near the characteristic absorption peak of the cooling working medium characteristic band radiation B. The cooling working medium jet diaphragm layer 9 has the highest absorption efficiency for the conversion characteristic band radiation A, which results in a better cooling effect of the spectral conversion coating 10 for the blade 12. Correspondingly, the temperature of the circulating working medium 8 can be greatly improved, which further improves the system efficiency of the Brayton cycle.

Further, referring to FIG. 4, the conversion characteristic band radiation A does not overlap the working medium characteristic band radiation C of the circulating working medium 8 which flows in the turbine 2. The conversion characteristic band radiation A does not overlap with the circulating working medium characteristic band radiation C and the cooling working medium characteristic band radiation B does not overlap with the working medium characteristic band radiation C. Referring to FIG. 5, the blade 12 can utilize the spectral conversion coating 10 and the cooling working medium jet diaphragm layer 9 to shield part of the heat released by the circulating working medium 8. The heat transferred from the circulating working medium 8 to the blade 12 by heat conduction and heat radiation can be converted as much as possible into the conversion characteristic band radiation A, and then can be absorbed and carried away by the cooling working medium jet diaphragm layer 9, so as to prevent the circulating working medium 8 from transferring the heat to the blade 12 by radiation, reduce the temperature rise caused by the high-temperature circulating working medium 8 of the blade 12 and enhance the cooling effect for the blade 12.

The cooling effect of the blade 12 after using the characteristic spectral coating and the jet cooling technology is now analyzed. For specific analysis, when the inlet temperature of the high-temperature turbine 2 is at 1,500° C., the temperature of the blade 12 of the turbine 2 can reach about 1,100° C. by utilizing the jet cooling technology, while the temperature of the cooling working medium jet is much lower than this temperature. The cooling working medium jet can be formed as an insulating layer between the high-temperature circulating working medium 8 and the blade 12; that is, a cooling working medium jet diaphragm layer 9 is formed. As shown in FIG. 5, the radiation of the high-temperature circulating working medium 8 is reflected back to the circulating working medium 8, the heat conduction and heat radiation of the high-temperature circulating working medium 8 transfer part of the heat to the blade 12, the spectral conversion coating 10 will convert the above heat into the conversion characteristic band radiation A which is strongly absorbed by the cooling working medium, and the absorption efficiency is nearly 100%. It can be obtained that, according to the Planck law of radiation, the radiation intensity outwardly provided by the black body at 1,100° C. is 20,149 W/m$^2$, while the band above 20 μm accounts for 1,168 W/m$^2$ and the ratio of radiation energy in the band 5 to 10 μm accounts for 32,417 W/m$^2$. The black body radiation intensity is the energy conversion limitation of the spectral conversion coating 10; that is, the maximum value of the conversion characteristic band radiation A of the spectral conversion coating 10 at this temperature is the radiation energy value of the black body in this band. 5 to 10 μm is selected as the characteristic wavelength interval of the spectral conversion coating 10. When the temperature of the cooling working medium is 400° C., the radiation amount of the external radiation between 5 to 10 μm is 5,089 W/m$^2$, then the radiation amount that can be transferred to the cooling working medium from the blade 12 at 1,100° C. is 27,328 W/m$^2$, and the heat transfer coefficient between the cooling working medium jet diaphragm layer 9 and the spectral conversion coating 10 is about 500 W/m$^2$, which means that it is also possible to increase the heat transfer temperature difference by about 50° C. in the case of the blade 12 being isolated from radiation heat transfer. The heat transfer temperature difference of 50° C. will bring about an improvement in the system efficiency of the Brayton cycle, and brings considerable benefits under the huge base number of power generation amount.

Referring to FIG. 3, an intermediate base layer 11 is provided between the spectral conversion coating 10 and the blade 12, and is made of a material with good thermal conductivity, generally a metal such as gold, silver, copper, aluminum or aluminum alloy and so on. The intermediate base layer 11 can transfer the heat on the blade 12 to the spectral conversion coating 10 which converts the above heat into the conversion characteristic band radiation A that can be easily absorbed by the cooling working medium and can be absorbed and carried away by the cooling working medium jet with lower temperature. The setting of the intermediate base layer 11 can not only transfer the heat on the surface of the blade 12 to the spectral conversion coating 10 better, but also improve the flatness of the surface of the blade 12. The spectral conversion coating 10 can be better attached to the surface of the blade 12 to ensure the adaptability of the spectral conversion coating 10.

In particular, both the spectral conversion coating 10 and the intermediate base layer 11 are coated on the surface of the blade 12. The adaptability of the spectral conversion coating 10 and the surface strength of the blade 12 can be ensured by means of coating.

In particular, the spectral conversion coating 10 is composed of nanoscale metal or semiconductor material with a certain structure. For example, silver nano-rods of silver material can be adopted and arranged at certain spacing and angle, and stacked in multiple layers to form a spectral conversion coating 10 (that is, the light radiator). When the radiation energy of the spectral conversion coating 10 is balanced with the heat exchange of the blade 12, the temperature can reach a stable value. The black body radiation intensity is the energy conversion limitation of the spectral conversion coating 10, that is, the maximum value of the conversion characteristic band radiation A of the spectral conversion coating 10 at this temperature is the radiation energy value of the black body in this band.

As previously mentioned, the spectral line width of the conversion characteristic band radiation A needs to be as small as possible and much smaller than the spectral line width of the cooling working medium characteristic band radiation B. However, the smaller the spectral line width of the conversion characteristic band radiation A is, the more difficult the spectral conversion coating 10 is designed. In general, the design of the spectral conversion coating 10 is based on a characteristic absorption peak of the cooling working medium, and the spectral line width of the conversion characteristic band radiation A mainly depends on the characteristic absorption spectrum of the cooling working medium as well as the material and the internal structure of the spectral conversion coating 10.

Referring to FIG. 6, the spectral conversion coating 10 sequentially includes a gold base layer 10a, an absorption cavity 10b, and a distributed reflection layer 10c, in which the gold base layer 10a is coated on the surface of the blade 12. The gold base layer 10a is provided on the surface of the intermediate base layer 11 due to the presence of the intermediate base layer 11. The gold base layer 10a can generate a harmonic resonance cavity with the distributed reflection layer 10c, and the absorption cavity 10b can absorb the above harmonic resonance and convert the absorbed heat into the radiation energy which is adjacent to the characteristic absorption peak of the cooling working medium. Specifically, when the spectral conversion coating 10 is working, the gold base layer 10a generate the harmonic resonance cavity with the distributed reflection layer 10c and effectively capture light in the absorption cavity 10b which absorbs the harmonic resonance and converts the absorbed heat. The gold base layer 10a and the distributed reflection layer 10c are utilized in combination with the absorption cavity 10b to obtain sharp, intense peak value of the absorption rate with small bandwidth, so as to improve the light absorptivity of the spectral conversion coating 10. The spectral conversion coating 10 can convert more heat on the blade 12 into the conversion characteristic band radiation A which is adjacent to the cooling working medium characteristic band radiation B, and the conversion characteristic band radiation A is absorbed and carried away by the cooling working medium jet, which increases the heat transfer temperature difference of the blade 12, improves the operating temperature of the turbine 2 in the Brayton cycle, thereby improving the system efficiency of the Brayton cycle.

Figure 7:
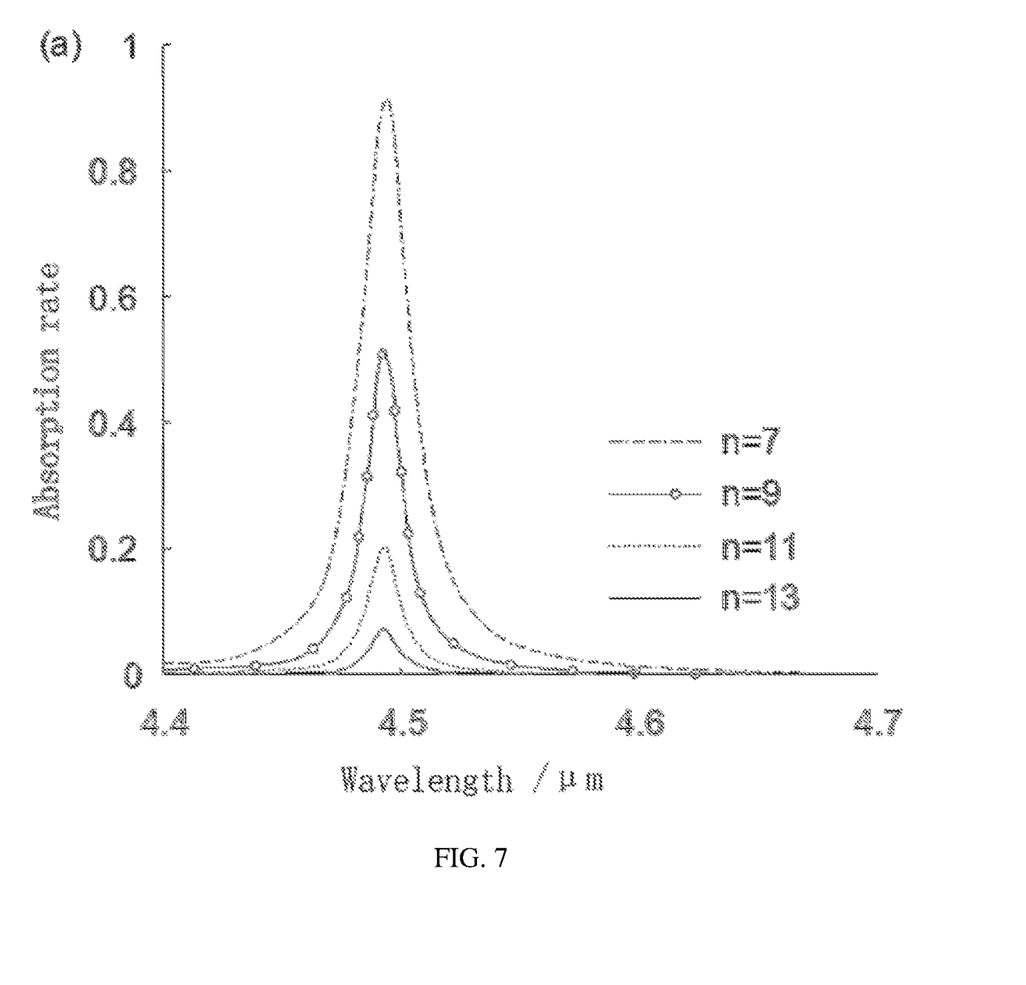
FIG. 7 is a schematic diagram showing the relationship between the number of layers of the distributed reflection layer and the radiation absorption rate of the circulating working medium.

Referring to FIGS. 6 to 8, the distributed reflection layer 10c is a distributed Bragg reflector (DBR), and is composed of Ge and $SiO_2$ or Ge and ZnS; the absorption cavity 10b is composed of $SiO_2$, and the gold base layer 10a is composed of gold. The absorption cavity 10b can be composed of a single layer or a multilayer structure, the length of which can affect the absorption peak value of the absorption spectrum and the absorption peak width of the spectral conversion coating 10. The number of layers n of the distributed reflection layer 10c also affects the absorption peak value and the corresponding absorption peak width. When the spectral conversion coating 10 is working, the gold base layer 10a and the distributed reflection layer 10c generate a harmonic resonant cavity. The longer the length of the intermediate absorption cavity 10b is, the narrower the absorption peak is; the more the number of layers n of the distributed reflection layer 10c is, the narrower the absorption peak is, and the lower the absorptivity of the radiation energy by the absorption peak is. Therefore, the number of layers n of the distributed reflection layer 10c cannot be too large, and n is, in an exemplary embodiment, 1 to 5. It is notable that the length of the absorption cavity 10b is generally an integral multiple of the characteristic wavelength; the harmonic resonant of the distributed reflection layer 10c and the gold base layer 10a has the effect of selecting a wavelength. The waveband of the conversion characteristic band radiation A which is converted by the spectral conversion coating 10 can be changed by changing the number of layers n of the distributed reflection layer 10c and/or the length of the absorption cavity 10b.

There is no doubt that the spectral conversion coating 10 can be used in any component which requires enhanced cooling in the Brayton cycle, and is not limited to the turbine 2. For instance, the spectral conversion coating 10 is used in the heat-collecting cavity 1a of the heat source 1. Specifically, referring to FIG. 9, the heat source 1 includes the heat-collecting cavity 1a. The inner surface of the heat-collecting cavity 1a is provided with a spectral conversion coating 10 which converts the radiation energy absorbed by the cavity of the heat-collecting cavity 1a into the conversion characteristic band radiation A which is strongly absorbed by the circulating working medium 8. The use of the characteristic spectral coating technology on the inner surface of the heat-collecting cavity 1a enhances the radiation heat exchange effect of the heat-collecting cavity 1a, prevents the temperature in the heat-collecting cavity 1a from being excessively high to burn out the heat-collecting cavity 1a, thereby ensuring the safe and efficient operation of the heat-collecting cavity 1, and improving the system efficiency of the Brayton cycle.

It has been experimentally verified that the working temperature can be increased by about 50° C. using the spectral conversion coating 10 for the turbine 2 with an inlet temperature of about 1,400° C. and the blade 12 temperature of about 1,100° C., and the system efficiency of the Brayton cycle can be improved by 1% to 2%.

Second Embodiment

A second embodiment of the present invention further provides a Brayton cycle, and is a further improvement of the first embodiment. Those not specifically described include reference numerals and text descriptions, all of which are the same as in the first embodiment. Thus, detailed description thereof will be omitted.

Referring to FIG. 10, the main improvement of the second embodiment relative to the first embodiment is that the Brayton cycle is a recompression Brayton cycle which can consume a part of the compression work to greatly reduce the irreversible loss of the heat regenerative process, so that the cycle efficiency of the Brayton cycle is significantly improved. Besides, the heat source 1 is concentrated and heated by the solar energy condenser 15; the regenerator 3 is provided with two apparatuses which are a high-temperature regenerator 3a and a low-temperature regenerator 3b respectively; the compressor 5 is also provided with two apparatuses which are the main compressor 5a and re-compressor 5b respectively.

Specifically, the hot side inlet 3a1 and the hot side outlet 3a2 of the high-temperature regenerator 3a are connected to the outlet of the turbine 2 and the hot side inlet 3b1 of the low-temperature regenerator 3b respectively. The hot side outlet 3b2 of the low-temperature regenerator 3b is connected with the inlet of the pre-cooler 4 and the inlet of the re-compressor 5b respectively. The inlet and outlet of the main compressor 5a are connected to the outlet of the pre-cooler 4 and the cold side inlet 3a3 of the low-temperature regenerator 3b respectively. The cold side inlet 3a1 of the high-temperature regenerator 3a is connected to the outlet of the re-compressor 5b and the cold side outlet 3b4 of the low-temperature regenerator 3b respectively. The inlet and outlet of the heat source 1 are respectively connected to the cold side outlet 3a4 of the high-temperature regenerator 3a and the inlet of the turbine 2.

During work, the circulating working medium 8 reaches a high temperature after heated by the heat source 1 which is concentrated by the solar energy condenser 15, and enters the turbine 2 to expand and work. The blade 12 of the turbine 2 adopts the jet cooling and characteristic spectral coating technology to ensure the safe work of the blade 12, and the turbine 2 drives the generator 6 to generate electricity through the shaft 7. The circulating working medium 8 after the work recover heat by the high-temperature regenerator 3a and the low-temperature regenerator 3b. The high-temperature cooling working medium reaches the low-temperature regenerator 3b to be condensed and discharged out of the Brayton cycle from the low-temperature regenerator 3b liquid outlet.

The circulating working medium 8 after the work sequentially flows through the high-temperature regenerator 3a and the low-temperature regenerator 3b to recover and shunt the heat. A stream of circulating working medium 8 is directly compressed into the high-temperature regenerator 3a by the re-compressor 5b; the other stream of circulating working medium 8 is cooled by the pre-cooler 4, and then compressed by the main compressor 5a and heated by the low-temperature regenerator 3b. The two streams of circulating working mediums 8 flowing out from the re-compressor 5b and the low-temperature regenerator 3b converge with each other; the circulating working medium 8 after the convergence sequentially enters the high-temperature regenerator 3a and the heat source 1 to be further heated to a high temperature, thus the thermal cycle is completed.

Note that the actual Brayton cycle structure is relatively complicated and may include processes like reheating, heat regeneration, recompression, partial cooling, intermediate cooling, and so on, and the embodiments of the present invention only describe the basic structure.

Those ordinary skilled in the art in this field will appreciate that, in the various embodiments described above, many technical details are proposed to provide the reader with a better understanding of the present application. However, the technical solutions claimed in the claims of the present application can be basically realized even without these technical details and various changes and modifications based on the above embodiments. Therefore, changes can be made for the above-described embodiments in the form and detail in practical use without departing from the spirit and scope of the invention.

The invention claimed is:

1. A turbine comprising:
 a plurality of blades, wherein:
  at least one of the blades has a cooling working medium inlet and at least one cooling working medium jet orifice;
  the at least one of the blades has a blade surface and is provided with a hollow interior;
  the at least one cooling working medium jet orifice is provided on the blade surface;
  the cooling working medium inlet is configured to enable a cooling working medium jet of a cooling working medium to enter the blade for cooling through the cooling working medium inlet;
  the blade surface is provided with a spectral conversion coating;
  the at least one cooling working medium jet orifice is configured to enable the cooling working medium jet entering the blade to flow out through the at least one cooling working medium jet orifice and form a cooling working medium jet diaphragm layer on a surface of the spectral conversion coating; and
  wherein the spectral conversion coating is configured to convert heat of the blade surface into a conversion characteristic band radiation which is radiation energy adjacent to a cooling working medium characteristic band radiation of the cooling working medium, wherein a central wavelength of a characteristic absorption peak of the conversion characteristic band radiation is the same as a central wavelength of a characteristic absorption peak of the cooling working medium characteristic band radiation.

2. The turbine according to claim 1, wherein the cooling working medium characteristic band radiation is concentrated by a spectral line width of the characteristic absorption peak of the cooling working medium characteristic band radiation.

3. The turbine according to claim 2, wherein a spectral line width of the conversion characteristic band radiation is smaller than the spectral line width of the cooling working medium characteristic band radiation.

4. The turbine according to claim 3, wherein the conversion characteristic band radiation does not overlap with a circulating working medium characteristic band radiation of a circulating working medium flowing in the turbine.

5. The turbine according to claim 1, wherein an intermediate base layer with good thermal conductivity is provided between the spectral conversion coating and the blade, and the intermediate base layer is configured to transfer the heat on the blade to the spectral conversion coating.

6. The turbine according to claim 1, wherein the material of the spectral conversion coating is a metal or a semiconductor, and the spectral conversion coating is coated on the blade surface.

7. The turbine according to claim 6, wherein the spectral conversion coating includes a gold base layer, in contact with the blade surface, an absorption cavity, and a distributed reflection layer, the absorption cavity and the distributed reflection layer being sequentially distributed on the gold base layer, and wherein the gold base layer is configured to generate a harmonic resonance with the distributed reflection layer, and the absorption cavity is configured to absorb the harmonic resonance and convert the absorbed heat into the conversion characteristic band radiation.

8. The turbine according to claim 7, wherein the distributed reflection layer is composed of Ge and $SiO_2$ or Ge and ZnS.

9. A Brayton cycle comprising:
a heat source,
a regeneator,
a pre-cooler,
a compressor,
a generator,
a circulating working medium circulating in the Brayton cycle, and
a turbine comprising:
 a plurality of blades, wherein:
 at least one of the blades has a cooling working medium inlet and at least one cooling working medium jet orifice;
 the at least one of the blades has a blade surface and is provided with a hollow interior;
 the at least one cooling working medium jet orifice is provided on the blade surface;
 the cooling working medium inlet is configured to enable a cooling working medium jet of a cooling working medium to enter the blade for cooling through the cooling working medium inlet;
 the blade surface is provided with a first spectral conversion coating;
 the at least one cooling working medium jet orifice is configured to enable the cooling working medium jet entering the blade to flow out through the at least one cooling working medium jet orifice and form a cooling working medium jet diaphragm layer on a surface of the first spectral conversion coating; and
 wherein the first spectral conversion coating is configured to convert heat of the blade surface into a conversion characteristic band radiation which is radiation energy adjacent to a cooling working medium characteristic band radiation of the cooling working medium, wherein a central wavelength of a characteristic absorption peak of the conversion characteristic band radiation is the same as a central wavelength of a characteristic absorption peak of the cooling working medium characteristic band radiation;
wherein the turbine, the generator and the compressor are connected by a same shaft; the heat source, the turbine, a hot side inlet and a hot side outlet of the regenerator, the pre-cooler, the compressor, a cold side inlet and a cold side outlet of the regenerator are sequentially connected; an outlet of the heat source is connected to an inlet of the turbine; an outlet of the turbine is connected to the hot side inlet of the regenerator; the hot side outlet of the regenerator is connected to an inlet of the pre-cooler; an outlet of the pre-cooler is connected to an inlet of the compressor; an outlet of the compressor is connected to the cold side inlet of the regenerator; and the cold side outlet of the regenerator is connected to an inlet of the heat source so as to form a circulating hot loop;
wherein the circulating working medium absorbs heat from the heat source; the circulating working medium after a rise of temperature expands and works in the turbine; the turbine drives the generator to generate electricity through the shaft; the expanded circulating working medium flows through the regenerator to exchange heat; the circulating working medium enters the pre-cooler, the compressor and the regenerator in turn after a fall of temperature; the circulating working medium flows out of the cold side outlet of the regenerator and enters the heat source again to absorb radiation energy; and power required by the work of the compressor is provided by the generator so as to complete a power generation cycle.

10. The Brayton cycle according to claim 9, wherein the heat source includes a heat-collecting cavity; an inner surface of the heat-collecting cavity is provided with a second spectral conversion coating; the second spectral conversion coating of the heat-collecting cavity converts radiation energy absorbed by the heat-collecting cavity into a conversion characteristic band radiation which is strongly absorbed by the circulating working medium.

* * * * *